Patented Nov. 3, 1931

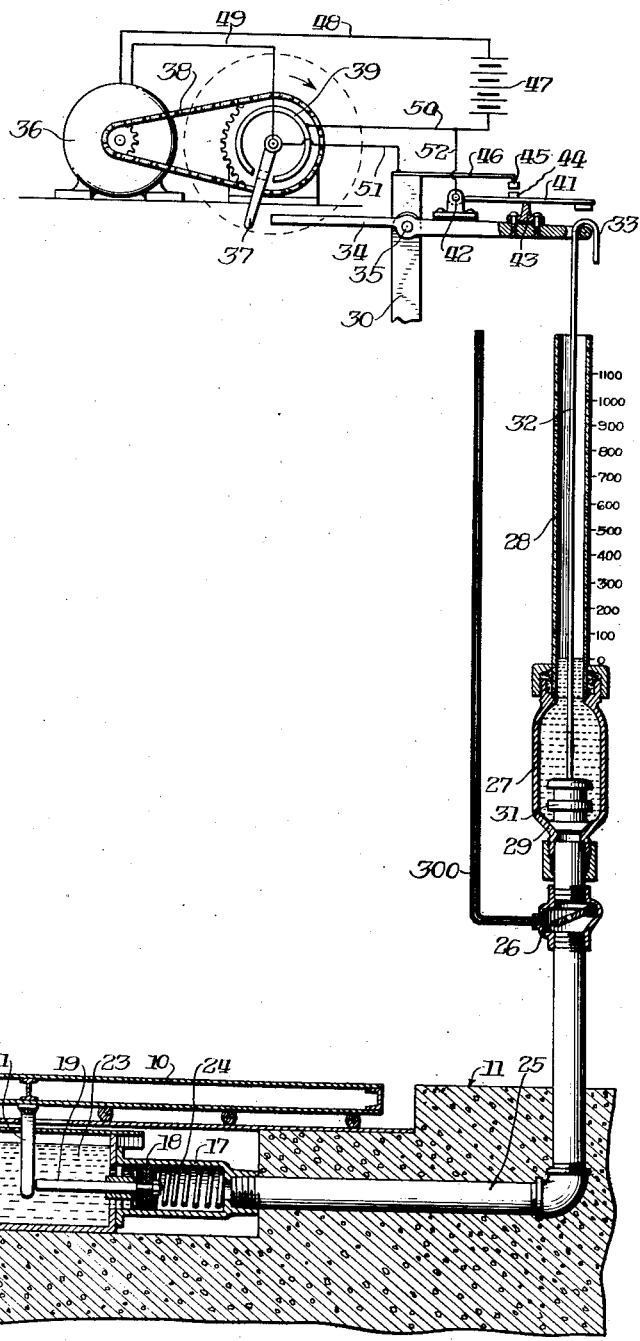

1,830,148

UNITED STATES PATENT OFFICE

IRA A. WEAVER, OF SPRINGFIELD, ILLINOIS, ASSIGNOR TO WEAVER MANUFACTURING COMPANY, OF SPRINGFIELD, ILLINOIS, A CORPORATION OF ILLINOIS

VEHICLE WHEEL BRAKE TESTER

Application filed March 7, 1929. Serial No. 345,006.

My present invention concerns features of novelty and betterment in appliances for testing the brakes of vehicles, such as automobiles, the preferred embodiment of the invention comprising a movable plate on which the vehicle wheel bears and which is adapted to be shifted by the resistance of the wheel thereon when the brake is applied, such appliance being provided with hydraulic means to indicate or register the resistance of the brake, the apparatus having means to compensate for the inertia effects of the various moving elements and being equipped also with means to return or to restore the indicating mechanism automatically to zero or normal position after a predetermined time interval, whereby the machine will then be ready or in condition for the next test.

The accomplishment of the above stated and other advantageous and beneficial results are secured in the present preferred embodiment of the invention, illustrated in the accompanying drawing, forming a part of this specification, the single view of such drawing showing the apparatus in large measure in section with some features presented more or less diagrammatically.

Referring to the drawing, it will be noted that the structure comprises a hollow, horizontal plate 10, the top face of which is substantially flush or even with the floor surface 11 and mounted to travel or shift lengthwise on a number of anti-friction rollers 12, 12 or other suitable bearing means with minimum friction, the plate being located at the top of a pit or cavity 13 formed in the floor.

It is this plate on which the vehicle wheel is adapted to travel and which moves longitudinally when the brake is applied to the wheel, such movement being permitted by the fact that that portion of the pit or cavity accommodating the plate is longer than the latter, as is clearly illustrated, a spring 14, anchored at one end at 15 and attached at its other end to an arm 16 fixed to and depending from the plate, opposing or resisting the forward movement of the plate to the right, as shown in the drawing, and returning the plate to the left-hand end of its stroke when permitted or allowed to do so.

The apparatus comprises also a stationary, horizontal cylinder 17 in the pit 13 below the plate and fitted with a reciprocatory piston 18 slidable therein and equipped with a piston-rod 19 adapted to cooperate with, but not directly connected to, an arm or projection 21 mounted on and extending down from the plate 10 through a sliding cover 22 into a tank 23 containing a suitable liquid supply which has free communication with the open adjacent end of the cylinder and consequently to the corresponding side of the piston or plunger.

As actually constructed, the cylinder 17 is mounted directly and fixedly on one side wall of the tank which is apertured in register with such cylinder to establish the connection or communication specified.

Between the other face of the piston or plunger and the opposite end or head of the cylinder a compression spring 24 is employed to return the piston to its initial left-hand position when the plate 10 and its lug 21 will permit such action.

The apertured, right-hand end of the cylinder is connected to a right-angle pipe 25 having a perforated or apertured, swinging check-valve 26 and which joins a chamber 27, which in turn carries and is in communication with an upright, appropriately-graduated glass tube 28 open to the atmosphere at its upper end.

Chamber 27 at its lower end has a conical valve-seat 29 with which a valve 31, having a cone frustum portion, in the chamber co-operates to hold the index liquid in the glass tube or gauge in which it is of course visible and its height readily seen, such valve being mounted on the lower end of a rod or wire 32 extended up out of the graduated gauge glass 28 and fitted at its top end with a hook 33 giving it a sliding or loose connection with one end of a lever 34 fulcrumed at 35, in any approved manner, on a fixed insulation support 30.

In addition, the appliance includes an electric-motor 36 arranged to rotate an electrical contact arm 37 through the instrumentality of any convenient speed-reduction driving means, such as the chain and sprocket-wheels 38 illustrated, such arm coacting with a nearly-complete, circular, stationary, electrical contact 39 with a suitable gap between its adjacent ends.

Lever 34 has a light-weight arm 41 insulated therefrom and hinged thereon at 42 with an insulated stop 43 on the lever to limit the downward swing of the arm, which extends over the hook 33 and which carries an electrical switch contact 44 designed and arranged to make and break touching relation with a companion, upper contact 45 carried on a leaf-spring 46 mounted on the support 30.

A battery, or other source of electrical supply 47, is connected by a wire 48 to one terminal of the electric-motor, the other terminal of the latter being joined by a wire 49 to the arm 37 which is also connected by a wire 51 to the spring 46 and its contact 45, the interrupted, circular contact 39 by wires 50 and 52 being connected to the other terminal of the battery 47 and to arm 41 and its contact 44.

Tank or receptacle 23, cylinder 17 and a portion of the piping system are supplied with a suitable quantity of any convenient liquid adapted to the purpose, the supply in tank 23 automatically compensating for any slight leakage which may occur around the periphery of the sliding plunger or piston.

An air vent pipe 300 of very small caliber or with a small conduit connection with the check-valve casing 26 extends up to about the same height as the gauge-tube 28.

The operation of the apparatus takes place practically as follows:

If a vehicle-wheel is freely rolled over the plate 10 toward the right as viewed in the figure of the drawing, no substantial movement of the plate will occur, but if, during such travel of the wheel on the plate, the brake is applied to the wheel, the plate will shift to the right a distance proportional to the braking effect in opposition to the restraining action of the calibrated spring 14.

Such movement of the plate, through the arm 21 and piston-rod 19, will shift the piston a corresponding amount and force the index liquid to its right through the check-valve 26 causing the automatic opening of valve 31 and a quick liquid ascent in the gauge-tube 28, it being understood, that, under normal, unoperated condition of the appliance, such liquid fills the space in cylinder 17, pipe 25, valve 26, chamber 27 and gauge-tube 28 up to its zero graduation mark, as shown in the drawing.

The momentum imparted to the liquid and to its actuating means by the braked wheel will be partly overcome by the restricted opening in the then closed check-valve 26, but the liquid will rise in the tube to a level above the correct position corresponding to the existing braking action, and, in order that such excessive momentum may not affect the final indication of the liquid level in the tube, as soon as the pull on the plate is removed, the spring 14 automatically returns it immediately to its original position, the spring 24 restores the piston to its initial station, pipe 300 preventing the creation of a suction which would interfere with such piston return, and the valve 31 descends and closes, but, in doing so, enough of the liquid escapes down through the valve-port to make amends for the slightly excessive quantity of liquid first forced upwardly through the valve-port in overcoming the inertia of the elements involved, so that when the valve 31 has closed, the correct quantity of liquid will be trapped above it, whereby its surface will indicate the proper braking effect in association with the correlated scale graduation.

The several elements entering into the registering of the braking force by the liquid are so related to one another that the greater the momentum, the higher the valve 31 will be lifted and the greater the quantity of liquid which will escape or flow back before the valve fully closes, whereby, under all circumstances, the quantity of the liquid retained above the valve after it closes will be proportional to the movement of the plate and hence it will register the braking action with exactitude and precision.

When valve 31 opens upwardly during the first upward rush of the liquid, the rod or wire 32 rises with it and the hook 33 rocks arm 41 upwardly making contact 44 to touch contact 45, thus initially closing the motor circuit causing the electric-motor to turn and the revolution of arm 37 to begin, whereupon it soon contacts with and maintains its touching relation with the element 39.

When valve 31 descends and closes its port, the motor continues in operation owing to the continuity of contact between the stationary ring 39 and the revolving contact arm 37, so that the operator has ample time in which to read the height of the liquid in the gauge-glass.

When, however, as arm 37 is about to complete its single revolution, its end engages and depresses the neighboring end portion of lever 34, rocking the latter on its fulcrum, and lifting the rod 32 and its valve 31 to allow all of the liquid above the latter to drain down through the port into the piping system below, and arm 37 upon reaching the gap in the contact-ring 39 automatically opens the motor circuit and terminates its operation so that all of the mechanical or electrical elements will be in or will immediately assume their original positions and conditions ready for the next brake test.

It will be apparent that the check-valve 26 acts to restrict the upward travel of the liquid somewhat but allows its quick downward discharge therethrough when the valve 31 is raised from its seat by the cooperation of arm 37 with lever 34.

Thus the appliance correctly registers or indicates the amount or extent of the braking force applied to the wheel by means of a liquid in a glass-gauge and such liquid is held or maintained at the indicating height an adequate length of time for the operator to obtain a reading with facility, whereupon the liquid is automatically drained out of the gauge ready for the next reading.

As explained the vent-tube 300 allows plunger 18 to return readily and it precludes the passage of the liquid past the plunger from the chamber 23 by reason of the avoidance of a vacuum condition in the cylinder 17.

Such vent allows the cylinder 17 during the return of the plunger, to fill up quickly by the liquid in the pipe while the reading of the level of the liquid trapped above the valve is being taken.

It will be observed, that in this appliance the liquid is at all times open to the atmosphere and the weighing of the load is done by the spring, in contrast to proposed schemes of using a liquid acting directly on the Bourdon tube in a pressure gauge.

Those acquainted with this art will readily understand that the invention is not limited to the precise details of structure shown and described and that the invention, as defined by the appended claims is susceptible of a variety of embodiments all incorporating the principal features of structure and function.

I claim:

1. In a brake-tester, the combination of a movably-mounted member adapted to be shifted by the contact therewith of the vehicle-wheel the brake of which is to be tested, a cylinder, a piston slidable in said cylinder, a conduit connected to the interior of said cylinder at one side of said piston and having an upright portion, an index liquid in said cylinder and conduit, means to slide said piston by the travel of said member, thereby changing the level of the liquid in the upright portion of said conduit, and a liquid supply reservoir connected to the interior of said cylinder on the other side of said piston.

2. In a brake-tester, the combination of a movable member adapted to be shifted by the contact therewith of the vehicle-wheel the brake of which is to be tested, means to resist such movement of said member and to return the latter to its original position when permitted to do so, an index, means to support said index, means to move said index by the travel of said member to show the braking force applied to the wheel, means to retain said index in its braking force indicating position, and automatic means to effect restoration of said index to its original position a predetermined period of time after its movement by the member.

3. In a brake-tester, the combination of a movable member adapted to be shifted by the contact therewith of the vehicle-wheel the brake of which is to be tested, means to resist such movement of said member and to return the latter to its original position when permitted to do so, an index, means to support said index, means to move said index by the travel of said member to show the braking force applied to the wheel, means to retain said index in its braking force indicating position, and automatic means to effect restoration of said index to its original position after its movement by said member.

4. In a brake-tester, the combination of a movable member adapted to be shifted by the contact therewith of the vehicle-wheel the brake of which is to be tested, means to resist such movement of said member and to return the latter to its initial position when permitted to do so, an index, means to support said index, means to move said index by the travel of said member to show the braking force applied to the wheel, means to prevent the momentum of the moving parts of the tester from affecting the, and hence permitting a, correct final indication by said index of the braking force exerted on the wheel, means to retain said index in said final indicating position, and automatic means to effect restoration of said index to its original position after its movement by said member.

5. In a brake-tester, the combination of a movable member adapted to be shifted by the contact therewith of the vehicle-wheel the brake of which is to be tested, means to resist such movement of said member and to return the latter to its initial position when permitted to do so, an index, means to support said index, means to move said index by the travel of said member to show the braking force applied to the wheel, means to prevent the momentum of the moving parts of the tester from affecting the, and hence permitting a, correct final indication by said index of the braking force exerted on the wheel, means to retain said index in said final indicating position, and automatic means to effect restoration of said index to its original position a predetermined period of time after its movement by the member.

6. In a brake-tester, the combination of a movable member adapted to be shifted by the contact therewith of the vehicle-wheel the brake of which is to be tested, means to resist such movement of the member and to return the latter to its initial position when permitted to do so, a conduit having an upright section, a liquid index in said conduit, means to move said index in said conduit by the travel of the member to show by its surface level in said upright section the braking force applied to the wheel, means to prevent the momentum of said index and other moving parts of the tester from affecting the, and hence permitting a correct final indication by said index of the braking force exerted on the wheel, means to retain said index in its braking force indicating position, and automatic means to effect restoration of said index to its original position after its movement by said member.

7. In a brake-tester, the combination of a movable member adapted to be shifted by the contact therewith of the vehicle-wheel the brake of which is to be tested, means to resist such movement of the member and to return the latter to its initial position when permitted to do so, a conduit of which a part at least is upright, a liquid index in said conduit, means to move said index in said conduit by the travel of the member to show the braking force applied to the wheel by the height of the liquid level in the upright part of said conduit, means to trap the upper terminal index portion of said liquid in said conduit, and automatic means to operate said trapping means to allow such index part of the liquid to be restored to the main body thereof a predetermined period of time after the original movement of the liquid.

8. In a brake-tester, the combination of a movable member adapted to be shifted by the contact therewith of the vehicle-wheel the brake of which is to be tested, means to resist such movement of the member and to return the latter to its initial position when permitted to do so, a conduit of which a part at least is upright, a liquid index in said conduit, means to move said index in said conduit by the travel of the member to show by the height of the liquid level in the upright part of the conduit the braking force applied to the wheel, means retarding the upward flow of said liquid in said conduit and allowing a freer flow therein in the opposite direction, means to trap the upper terminal index portion of said liquid in said conduit, and automatic means to operate said trapping means to allow such index part of the liquid to be restored to the main body thereof a predetermined period of time after the original movement of the liquid.

9. In a brake-tester, the combination of a movable member adapted to be shifted by the contact therewith of the vehicle-wheel the brake of which is to be tested, means to resist such movement of the member and to return the latter to its initial position when permitted to do so, a conduit of which a part at least is upright, a liquid index in said conduit, means to move said index in said conduit by the travel of the member to show by the height of the liquid level in the upright part of said conduit the braking force applied to the wheel means to trap the upper terminal index portion of said liquid in said conduit automatically in correct indicating position after allowing a part of said portion to return to the liquid supply in the conduit to prevent the momentum of the liquid and its propelling means from affecting the correctness of the final indicating position of the level of the index portion of such liquid, and automatic means to operate said trapping means to allow such index part of the liquid to be restored to the main body thereof a predetermined period of time after the original movement of the liquid.

10. In a brake-tester, the combination of a movable member adapted to be shifted by the contact therewith of the vehicle-wheel the brake of which is to be tested, means to resist such movement of the member and to return the latter to its initial position when permitted to do so, a conduit of which a part at least is upright, a liquid index in said conduit, means to move said index in said conduit by the travel of the member to show by the height of the liquid level in the upright part of the conduit the braking force applied to the wheel, means retarding the upward flow of said liquid in said conduit and allowing a freer flow therein in the opposite direction, means to trap the upper terminal index portion of said liquid in said conduit in correct indicating position after allowing a part of said portion to return to the liquid supply in the conduit to prevent the momentum of the liquid and its propelling means from affecting the correctness of the final indicating position of the level of the index portion of such liquid, and automatic means to operate said trapping means to allow such index part of the liquid to be restored to the main body of the liquid a predetermined period of time after the original movement of the liquid.

11. In a brake-tester, the combination of a movable member adapted to be shifted by the contact therewith of the vehicle-wheel the brake of which is to be tested, means to resist such movement of the member and to return the latter to its initial position when permitted to do so, a conduit of which a part at least is upright, a liquid index in said conduit, means to move said index in said conduit by the travel of the member to show by the height of the liquid level in the upright part of said conduit the braking force applied to the wheel, means to trap the upper terminal index portion of said liquid in said conduit in correct indicating position after allowing a part of said portion to return to the liquid supply in the conduit to prevent the momentum of the liquid and its propelling means from affecting the correctness of the final indicating position of the level of the index portion of such liquid, a vent-pipe to the atmosphere connected to said conduit below said trap to allow the liquid below said trap to return to its original position while the trap is closed, and automatic means to operate said trapping means to allow such index part of the liquid to be restored to the main body of the liquid a predetermined period of time after the original movement of the liquid.

12. In a brake-tester, the combination of a movably-mounted member adapted to be shifted by the contact therewith of the vehicle-wheel the brake of which is to be tested, a conduit of which a part at least is upright, a cylinder connected to said conduit, a piston slidable in said cylinder, a body of liquid in said conduit and cylinder, means actuated by the movement of said member to slide said piston to propel the liquid in said conduit and upwardly in said upright part, means to resist such movement of said member and to return said member and piston to their initial positions, means retarding the upward flow of said liquid in said conduit and allowing a freer flow therein in the opposite direction, means to trap the upper terminal index portion of said liquid in said conduit in correct indicating position after allowing a part of said portion to return to the liquid supply in the conduit to prevent the momentum of the liquid and its propelling means from affecting the correctness of the final indicating position of the level of the index portion of such liquid, a vent-pipe to the atmosphere connected to said conduit on the cylinder side of said trap to allow the liquid below said trap to return to its original position while the trap is closed, and automatic means to operate said trapping means to allow such index part of the liquid to be restored to the main body thereof a predetermined period of time after the original movement of the liquid.

In witness whereof I have hereunto set my hand and seal.

IRA A. WEAVER.